United States Patent Office 3,563,786
Patented Feb. 16, 1971

3,563,786
METHOD OF RENDERING WATER-PERVIOUS BUILDING MATERIALS HYDROPHOBIC
Sydney Arthur Tse, 15 Constable St.; Cedric Jack Tse, 531 Broadway, Strathmore Park; and Charles Athol Pierard, 20 Milne Terrace, all of Wellington, North Island, New Zealand
No Drawing. Filed Sept. 18, 1967, Ser. No. 668,707
Claims priority, application New Zealand, Sept. 22, 1966, 146,437
Int. Cl. B44d *1/44;* C04b *31/44*
U.S. Cl. 117—62.1
17 Claims

ABSTRACT OF THE DISCLOSURE

A method of water-proofing water pervious building material wherein the building materials are impregnated with an emulsion of unsaponified wax globules in an aqueous solution of a water soluble soap or soaps. This impregnant composition is then contacted with an aqueous solution of water soluble metal salt or salts to precipitate an insoluble metallic soap. An antioxidant is used in the mixture to prevent ultraviolet light degradation.

---

This invention relates to a method of rendering water-pervious building materials hydrophobic or water-repelling, to compositions for use in this method, and to hydrophobic building materials produced thereby.

It is generally recognized that apart from the effects of seismic phenomena, the action of water results in more destruction and damage to building materials than that arising from any other known cause. The following are some typical examples of readily apparent effects of water operating upon or gaining ingress or the interior of fabricated building materials such as for example bricks, building stones, gypsum plasters and boards, portland cement or lime-containing concretes, blocks or like structures.

(1) An excessive degree of moisture movement in materials which absorb water or are permeable to water.

(2) The migration of water-soluble salts particularly within concrete building materials with results such as (a) efflorescence due to crystallization of salts transported to the building material surface, (b) surface disfigurement due to carbonation of calcium salts which have become concentrated on the surface by leaching and drying, and (c) spalling due to crystallization of salts deposited within the substance of the building material.

(3) A progressively increasing condition of channelling within the substance of water-pervious building materials.

(4) Unpredictable variations in compressive and tensile strengths.

(5) Cracking of concrete and/or plaster building materials causing the development of stresses and strains in the materials and also exposing embedded reinforcement to atmospheric corrosion.

(6) Loss of insulating properties due to increased thermal conductivity of the building materials caused by the presence of water and coldness of floors and interiors of brick and concrete buildings due to thermal absorption and depression of temperatures caused by evaporation of moisture from the surfaces.

(7) Damage to protective coatings, plasters and the like due to the effects of retained water, water vapour, and moisture movements within concrete building materials.

(8) Condensation of atmospheric moisture on internal surfaces of buildings resulting in dampness and conditions often favouring the growth of various types of mould.

(9) Unpredictable shrinkage on drying and also expansion on wetting often resulting in a degree of permanent deformity. In lightweight concretes, such shrinkage may be accompanied by crazing and cracking and opening of joints and plaster bonding failures.

(10) Disintegration of masonry and other building materials from cycles of freezing and thawing of entrapped water.

The abovementioned undesirable characteristics of excessive water and moisture permeability are particularly associated with and present in most porous and lightweight concretes in use today, such as those containing pumice, perlite and vermiculite. Accordingly lightweight concrete products are restricted to situations where the in situ conditions are not excessively wet or otherwise exposed to the elements. When such products are used in wet conditions extremely expensive surface treatments are necessary to prevent excessive extension of damage and disfigurement. Large sums are spent annually in endeavours to minimise the above deleterious effects of moisture operating on pervious concrete and other pervious building materials and any measure that will control or check moisture movement must have considerable economic advantages.

Previous attempts at overcoming the abovementioned deleterious effects of water upon building materials have included the addition to concrete mortars and plasters containing calcarious materials such as lime and portland cement, of separate or individual substances derived from or containing fatty acids, rosin soaps or emulsified unsaponifiable waxes in order to produce water-repellence. For example calcium stearate, aluminium stearate, and magnesium stearate and the corresponding oleates, resinates and palmitates have each been used separately in the form of dry powders for the purpose of imparting water resistance to building materials, notably portland cement concretes, by mixing the dry powders with dry cement, then adding dry aggregate, followed by the incorporation of gauge water.

Oleic acid soaps diluted with water and sometimes ethyl alcohol have been prepared and marketed for use as additives for portland cement mixtures to produce a degree of water repellence in the ultimate products. Soaps prepared from stearic acid have also been marketed for the same purpose. Likewise, mixtures of water-soluble soaps from fatty acids and silica gel, and water soluble alkali soaps from rosin, have been marketed as water-proofing agents for concretes.

Cement manufacturers are today producing portland cement with which is incorporated up to 0.2% of oleic acid, which product is frequently referred to by the misleading term "water-proof" cement.

The effectiveness of soaps such as those hitherto used, for example oleates and stearates, depends upon the somewhat random precipitation of hydrophobic water-insoluble soaps by the action of metallic cations, principally calcium, made available from the portland cement or lime. The results are variable because complete dispersion of the soaps could not be achieved and there is a consequential failure in water-resistance in various places. Furthermore the films of water-insoluble metallic soaps thus precipitated from such soaps are in general brittle and insufficiently adherent to the component particles of fabricated building materials to ensure durability of water-repellence under cycles of wetting and drying.

Other water repelling agents in current use are paraffin wax emulsions, ceracines, ozokerites, bitumen, synthetic resin emulsions and also water-soluble silicates. Apart from the water-soluble silicates, these water repelling agents do not rely upon chemical precipitation with transformation of soluble substances to insoluble water barriers. Their effectiveness in imparting water resistance is due mainly to their ability to mechanically impede the movement of water. The performance of members of this group is chiefly dependent upon the size and distribution of the emulsion globules.

Despite all such efforts made to develop a completely satisfactory water-repelling agent for portland cement products and concretes, many problems associated with the ingress of water to these materials still exist. Variables and often transitory effects which follow application of many of these known water-repelling agents are mainly responsible for continuation of the intensive search for improvements in this field of technology.

The object of the present invention is to eliminate or reduce within tolerable limits on a commercially economic basis the above-mentioned deleterious effects of water on a wide range of water-pervious building materials, with particular reference to many of the existing types of light-weight concrete and their aggregate components, thus widening the uses or applications of such building materials.

In contradistinction to the prior art processes, the method of the present invention for rendering water-pervious building materials as hereinafter defined, hydrophobic comprises the steps of impregnating said building materials with an impregnant composition essentially comprising an emulsion of unsaponified wax globules in an aqueous solution of water-soluble soap or soaps and also containing a compatible antioxidant, converting said water-soluble soaps into water-insoluble metallic soaps by contacting the impregnated building material with a precipitant composition essentially comprising an aqueous solution of water-soluble metallic salt or salts, the metallic cation or cations being such that will form water-insoluble metallic soaps, and drying the resultant hydrophobic building material.

The method of the present invention may be applied equally to the surfaces of fabricated building materials as to surfaces of building material aggregates from which such fabricated building materials may be prepared in conventional manner. Accordingly the term "water-pervious building materials" used in the present specification and claims is defined as including both lightweight building material aggregates selected from the group consisting of naturally occurring lightweight aggregates such as pumice, volcanic ash, scoria, diatomite and perlite rhyolites, artificially expanded or sintered lightweight aggregates such as those produced from perlite, vermiculite, obsidian, slate, shale, furnace slags and clay, and treated cellulosic substances such as fibres, sawdust, wood-slivers and chips, and fabricated building materials selected from the group consisting of masonry, building stones and constructional units such as may be fabricated from portland cement concretes or cement such as for example plasters, mortars, building blocks, roof and floor tiles, wall panels, slabs, beams, pipes and cement asbestos sheets, boards and panels, gypsum plaster products including ceiling and wallboards, mouldings and castings, sorel cement products and pozzolanic cement products.

The method of the present invention is particularly useful in rendering hydrophobic, i.e., rendering water-repelling, the lightweight building material aggregates set forth in the preceding paragraph and which may be used, for example in the manufacture of lightweight concrete, i.e., concrete which may range in weight from approximately 30 to 130 pounds per cubic foot as compared with conventional types of concrete which generally range in weight from 140 to 150 pounds per cubic foot. These lightweight aggregates may also be used as components of gypsum or plaster of paris plasters for interior building linings, wallboards, cast or sawn slabs, or the like, where some degree of water resistance coupled with lightness and high thermal insulating properties are an advantage.

The impregnant composition for use in the method of the present invention essentially comprising an emulsion of unsaponified wax globules in an aqueous solution of water-soluble soap or soaps and also containing a compatible antioxidant is prepared by the alkali saponification of a suitable wax or combination of waxes and fatty acids also containing the compatible antioxidant.

Suitable alkalis or alkaline substances for effecting this saponification comprise the alkali metal hydroxides, for example sodium hydroxide and potassium hydroxides, ammonium hydroxide, and amines such as, for example, morpholine, mono-, di-, and triethanolamine and the like.

Suitable waxes or combinations of waxes and fatty acids are those which upon suitably controlled saponification in the presence of water will produce water-soluble soap or soaps accompanied by unsaponifiable wax or wax fractions which remain in the final product in the form of a stable emulsion. Accordingly the combination of waxes and/or fatty acids must include at least one combination selected from the group consisting of partially saponifiable waxes, mixtures of saponifiable fatty acids and unsaponifiable waxes, and mixtures of saponifiable waxes and unsaponifiable waxes.

The saponifiable waxes may be fully saponifiable, for example the fully saponifiable vegetable wax (Japan wax), or partially saponifiable, for example the partially saponifiable vegetable wax (Carnauba wax), beeswax, candelilla wax, and the like.

Unsaponifiable waxes include, for example, paraffin waxes, ceracines, products of refining paraffin, ozokerite, and the like. Some of the bitumens may be represented in the two latter classes. When unsaponifiable waxes are used in preparing the impregnant composition, dispersing agents such as abiotic acid or colophony resin may be used and those waxes which are refractory to emulsification may be emulsified by the use of triethanolamine stearate.

Saponifiable fatty acids include oleic acid or olein, stearic acid, palmitic acid and the like. These fatty acids are completely saponifiable to produce water-soluble soaps, for example ammonium oleate, palmitate, or stearate, which by virtue of their surfactant properties aid in the dispersion of the wax globules.

Additional water-soluble soaps to assist in the production of a stable emulsion of the unsaponifiable wax or wax fractions may be formed by saponification of colophony resin or resin acids or acids derived therefrom.

The choice of the waxes and any fatty acids for saponification and the relative pro portions thereof will largely depend upon the requirements of the impregnant composition and the characteristics of the building material to which it is to be applied as well as the availability and cost of the ingredients.

A preferred combination of waxes and fatty acids for preparing impregnant compositions useful with most siliceous and cellulosic aggregates is the combination of colophony resin, Japan wax, Carnauba wax and oleic acid or olein. The Japan wax is easily and fully saponified, the Carnauba wax is only partially saponified and the water-soluble soaps from the saponification of the resin and oleic acid or olein aid emulsification of the unsaponifiable wax fraction of the Carnauba wax.

Any selected combination of waxes and any fatty acids are saponified with the alkali or alkaline substance in known manner, for example by heating in the presence of water. The proportion of alkali or alkaline substance used should be sufficient to saponify fully the fatty acids present in the waxes and any free fatty acids present. The saponification must be accompanied by vigorous stirring to ensure emulsification of the unsaponifiable wax or wax fractions. At the completion of the saponification and emulsification process and in the last stage of preparing the impregnant composition, stabilization of the emulsion is achieved by rapid solidification of the heat softened wax globules by the addition of cold water. Rapid cooling of the softened wax is necessary to prevent coalescence or fusion of the wax globules.

If found desirable or necessary an emulsion stabilizing agent may be added at this juncture to increase viscosity and to ensure the highly dispersed condition of the wax emulsion is maintained over prolonged storage of the product. Suitable emulsion stabilising agents are the protective colloids which include gelatin, casein, gum acacia, hydroxymethyl or ethyl cellulose, carboxymethyl cellulose, carboxyvinyl polymers, polyacrylates, and the like. When it is found advantageous to use a protective colloid it is advisable to include a suitable antiseptic such as sodium pentachlorophenate or the like in the formulation.

Waxes, fatty acids and fatty acid soaps whether water-soluble or water-insoluble, when exposed to ultraviolet radiations, undergo oxidation and rapidly deteriorate. A stable and compatible antioxidant must therefore be included in the impregnant composition both to prevent the composition from deterioration and to increase the resistance of the ultimately deposited water-insoluble metallic soap to oxidation. A preferred antioxidant is butylated hydroxytoluene which may be present in the impregnant composition at a concentration of one part per million.

The precipitant composition for use in the method of the present invention essentially comprises an aqueous solution of one or more water-soluble metallic salts, the metallic cation or cations being such as are capable of forming water-insoluble metallic soaps. Accordingly, when the precipitant composition is incorporated with, or otherwise brought into contact with, an impregnant composition, the water-soluble alkali-soaps thereof are converted into a hydrophobic precipitate of water-insoluble metallic salts.

Suitable such water-soluble metallic salts include calcium chloride, barium chloride, zinc chloride, zinc sulphate, aluminium sulphate, and the like.

The following examples illustrate the preparation of impregnant and precipitant compositions. It should be understood that such matters as the choice of a particular combination of materials to produce either type of composition will be dependent upon an appreciation of certain practical conditions for which the concrete technologist might have to provide. These special circumstances may generally be met by slight modifications to the examples. It should be understood therefore that the examples set out are not intended to limit or restrict the invention or the choice of materials or their quantities to only those stated.

EXAMPLE 1

A general formulation for an impregnant composition is as follows:

Colophony resin (Resin N) ___percent by weight__ 2.5
Japan wax _____do____ 1.5
Carnauba wax _____do____ 1.0
Oleic acid _____percent by volume__ 2.5
Ammonia _____do____ [1] 8.0
Anti-oxidant:
  Butylated hydroxytoluene __percent by weight__ 0.1
  Water to make up to 100% by volume.

[1] 0.88 specific gravity.

The weighed solids and measured volume of oleic acid or olein are added to 50 mls. of water and the mixture is heated to a temperature of about 95 degrees C. to melt the additives completely. Six mls. of strong ammonia solution is carefully added in small increments while stirring continuously. The mixture is then heated for approximately fifteen minutes and allowed to cool to a temperature of about 70 degrees C. At this point a further 2 mls. of strong ammonia solution is added with stirring. The mixture is then immediately brought to a total volume of 100 mls. with quickly added *cold* water. This impregnant composition is stable under normal storage conditions.

EXAMPLE 2

Colophony resin _____percent by weight__ 3.0
Oleic acid or olein _____percent by volume__ 3.0
Woolgrease _____percent by weight__ 1.5
Japan wax _____do____ 2.0
Carnauba wax _____do____ 1.5
Butylated hydroxytoluene _____do____ 0.1
Concentrated ammonium:
  Hydroxide solution (S.G. 0.880) _____mls__ 4
  Tetrahydro-1-4 oxazine _____ 3
Water to produce 200 mls. of total volume.

Procedure

The waxes, resin, oleic acid or olein and anti-oxidant are heated with 100 mls. of water to about 90 degrees C. with mixing until waxes, resin and oleic acid or olein are melted completely. It is important in order to avoid gelatin to ensure that an excess of ammonium hydroxide is always present in this product. The temperature of the mixture is raised to about 95 degrees C. by heating with continued stirring. The temperature of the mixture is lowered to 70–80 degrees C. by permitting the mixture to cool with continued stirring, then sufficient cold water is quickly added to bring the volume to 200 mls.

In commercial production the waxes, oleic acid or olein lanolin or woolgrease, butylated hydroxytoluene, may be melted together and poured into convenient sized and/or weighed blocks or granulated. A wax dispersible silicone resin similar in type to that used in car or furniture polishes and the like, may replace woolgrease in the above formulation. Gersthoven or candelilla or the like hard waxes may be substituted for carnauba wax. Beeswax, some of the cerecines and ozokerites may also replace some or all of the Japan wax. From the above it will be obvious that a wide range of simple, compound and derived lipid substances and waxes of synthetic or artificial, animal, mineral or vegetable origin may replace some of the components mentioned. It will also be evident that apart altogether from the emulsions above referred to, combinations of preformed emulsions such as those of other saturated paraffinic hydrocarbons may be for simplicity included, for example, commercial emulsions of paraffin wax may be incorporated with the above product if found desirable. It should be noted that with the choice of materials offering variations in temperature should be made to accommodate differences in physical properties.

EXAMPLE 3

A preferred formulation for a concentrated impregnant composition is as follows:

Colophony resin, grade N, by weight: 25.0 grams
Japan wax, by weight: 15.0 grams
Carnauba wax, by weight: 10.0 grams
Oleic acid, by volume: 25.0 ml.
Sodium hydroxide, by weight: 12.0 grams
Butylated hydroxytoluene, by weight: 0.1 gram
Water is added to make up to 1000 ml.

The weight of solids and measured volume of oleic acid are added to 300 ml. of water and the mixture is heated to boiling to melt the waxes completely. Dissolve the caustic soda separately in 25 ml. of water and then add this solution in small increments to the melted wax while stirring continuously with a mechanical mixer. The mixture is then heated to boil for approximately 40 minutes, then allowed to cool to a temperature of about 60 degrees C. The mixture is immediately brought to a total volume of 1000 ml., with quickly added *cold* water. Throughout the above procedure it is important to ensure complete saponification and emulsification. The mixture is at all times from the initial melting stage of the wax, to final emulsification and cooling, subjected to constant and effective mechanical mixing.

Rapid cooling of the softened wax is necessary to prevent coalescence or fusion of the wax globules and it may be necessary to provide special highly efficient mixing and cooling apparatus to ensure that an optimum range of particle sizes is formed during emulsification.

For economic or other reasons it may be necessary to substitute other components of similar characteristics for those shown in the above preferred formulation, for example, candelilla wax may be substituted for carnauba wax. A mixture of beeswax and hard ceracine may also be substituted for carnauba wax.

Other alkalis or alkaline substances, such as ammonium or potassium hydroxide, or triethanolamine may be substituted in the above formulation for the sodium hydroxide in terms of their equivalence to sodium hydroxide.

EXAMPLE 4

The preferred formulation for a concentrated precipitant solution comprises:

Aluminium sulphate by weight 200 grams

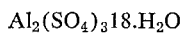

$Al_2(SO_4)_3 18.H_2O$

Water to make up to 1000 ml.

or alternatively:

Zinc sulphate $ZnSO_4 \cdot 7H_2O$ may be used in the same concentration as above to treat preferably new portland cement and particularly fibrolite surfaces.

Again, barium chloride may be used in the same concentration if gypsum plaster or sorel cement surfaces are to be treated.

The precipitant solution should be stored in plastic containers.

The method of the present invention briefly consists in impregnating the water-pervious building material with an impregnant composition followed by contacting the impregnated building material with a precipitant composition. The actual detailed performance of this method may vary and will differ depending upon whether the building material being treated is a fabricated building material or a building material aggregate.

In the case of some lightweight building material aggregates, it may be found an advantage, even necessary, to impregnate under a vacuum. The porous aggregate is contained in an air-tight receptacle and is submerged in the impregnant composition. Air is exhausted from the closed receptacle and when it is observed, through an inspection port, that air bubbles no longer emerge from the submerged aggregate, the interior of the receptacle is opened to the atmosphere. By this means air contained in open tubules or cavities, or entrapped between mineral plates in the aggregate, is expelled under vacuum and replaced by the impregnant compositions when pressure reverts to atmospheric. A usually effective working or operating strength for the impregnant composition in this procedure is one part by volume of the impregnant composition prepared according to any one of Examples 1 to 3 diluted with water to produce 40 parts by volume. The precipitant composition of Example 4 is diluted to the same extent when used in this procedure. The surplus impregnant composition is drained off and the aggregate is submerged in the precipitant solution for a sufficient length of time to ensure precipitation of the desired hydrophobic coating. It has been found in practice that for some naturally occurring lightweight aggregates the second stage of treatment need not be carried out under vacuum conditions.

The treated aggregate particles are again drained and kiln dried at low temperature (40–45° C.), or atmospherically dried to eliminate residual water and enable the precipitated film to adhere to the aggregate surface. On drying the treated aggregate develops its "maximum" water repellency. At no time during curing or drying of any treated product should the temperature be allowed to rise to or above the melting point of precipitated hydrophobic films.

Where the cost of heat is not important the first or impregnation stage may often be brought about by submerging the aggregate in a hot solution of impregnant composition for a sufficient time to displace contained air and allowing the aggregate to cool while still submerged in the liquid.

Where the production of treated aggregates is not restricted by demands of factory space saving or rapid throughput, the lightweight aggregates may be impregnated by simple steeping or dipping into the impregnant composition, for example, by holding the aggregates in a slowly rotating perforated or gauze-wall container dipped into a tank of the impregnant composition, the aggregate preferably filling not more than half of the container. The concentration of the impregnant composition is regulated to provide an aggregate coating or film of the required thickness, and the immersion period should be of sufficient length to ensure coating of all aggregate surfaces.

A number of lightweight aggregates including some pumices and vermiculites may be impregnated by tumbling the aggregates and impregnant composition, for example, in a concrete mixer, for a predetermined length of time.

To avoid the disadvantage of excess retained water which has to be removed at some stage, porous aggregates may be treated with impregnant composition by a suitable spraying process, whereby the impregnant composition is sprayed into a cylinder or chamber through which the aggregates are dropped by gravity. This method enables a sufficient amount of particle coating to be deposited without the disadvantage of excessive water being absorbed into the aggregate.

The precipitant composition may be applied similarly and immediately after the above treatment. In the above practice for spraying, the concentration of the respective impregnant and precipitant compositions should approximate one part of the compositions prepared according to any one of the specific examples to five parts with water.

It is well known in concrete technology that aggregate characteristics may vary considerably, even with materials taken from the same borrow area. Therefore the composition and concentration of the impregnant and precipitant compositions should be adjusted by practical check testing with each batch of material to be treated to ascertain such factors as porosity and surface reactivity, or it may be necessary to cast suitable test units which should be checked to show the most suitable formulation to employ in the treatment process.

The lightweight aggregates rendered hydrophobic by the method of the present invention may be stored indefinitely and, whenever desired, may be used in any of the normal applications of lightweight building aggregates, for example, in the manufacture of lightweight concrete by conventional concrete-manufacturing processes. The resultant lightweight fabricated building materials exhibit marked characteristics such as increased water-resistance, highly reproducible compressive and tensile strengths (with water to cement ratios comparable to those obtainable in dense concrete), tolerable shrinkage and good thermal conductivity factors, desirable acoustical and good fire rating factors.

In the case of fabricated building materials, the impregnant and precipitant compositions are applied to the building material surfaces by any suitable coating means, for example, spraying, roller coating, brushing, swabbing and dipping.

For the treatment of such surfaces as those of masonry, porous building stone, cellulosic wall and ceiling boards and panels, gypsum plaster boards and panels, fibrolite and asbestos cement products and materials containing portland cement, the working strengths of the impregnant and precipitant compositions is preferably one part of a concentrate prepared according to any one of the specific examples to twenty parts of water.

In certain cases it may be found desirable and advantageous to pretreat the surface of the building material, e.g. the surface of masonry, natural building stones, earthenware bricks and pipes, with a precipitant composition and preferably make a further application of the precipitant composition after impregnation with the impregnant composition. This is particularly the case with heavily carbonated surfaces of cementitious building materials which may with advantage be pretreated with a precipitant solution of twice the concentration recommended above.

Fresh cementitious building materials such as portland cement concrete and fibrolite may contain calcium or even aluminium salts normal to the cement and such salts will assist in the precipitation of the hydrophobic metallic soaps out of the impregnant composition. Similarly with calcium hydroxide present in fresh lime mortar plaster. Furthermore such an "internal" precipitant may be formed in situ in cementitious materials by a preliminary treatment with hydrochloric acid and this is particularly desirable with old concrete surfaces where the calcium salts have become carbonated.

The penetration of both the impregnant and precipitant compositions into the pervious fabricated building materials may be facilitated and deeper penetration obtained by using aqueous ethanol or methanol as the diluents for the concentrates prepared according to the specific examples.

The method of the present invention confers upon the treated building materials and, in the case of treated aggregates, building materials fabricated therefrom, a greater degree of water-repellence and resistance to the deleterious effects of water than would be the case with untreated building materials. This is illustrated in Example 5 below.

Furthermore the method of the present invention produces a more durable homogeneous and efficient water resisting ultimate product than has been found possible by using simple combinations of fatty acids, preformed water-insoluble metallic soaps, or preferred emulsions according to any of the known prior art processes.

It is believed that this water-repellency or resistance is a direct result of the novel controlled physical and chemical reaction occurring during the performance of the method of this invention. The water-soluble soap or soaps in the impregnant composition not only assist in the emulsification of the unsaponified wax globules but, upon application to a porous building material, spread over the material forming a uniform adherent coating thereon and facilitating the entrance of the wax globules into the pores and tubules of the material. Upon treatment with the precipitant composition the water-soluble soaps are converted into a durable and firmly adherent film of water-insoluble metallic soaps which confer hydrophobic properties to the treated materials as they mature and dry out after treatment. Such films are softer, more pliable, durable and adherent than any films produced by a known prior art process but in addition they bond the wax globules in position which, as well as possessing water repelling characteristics, obstruct the passage of water through the pores or tubules of the treated material.

EXAMPLE 5

The following is an example of the water repellency conferred by the method of this invention which was applied to the treatment of a carefully graded pumice aggregate obtained from a local source and its incorporation with portland cement to produce check test information.

The sample of graded pumice was divided into two lots. One lot was treated by the above procedure and the other left untreated. To each separate lot was added one part of cement to five parts of aggregate.

Plain water was added until a required plasticity was obtained. It was noted that the amount of water required for the untreated aggregate was appreciably higher than that used in the treated sample.

The aggregate and cement mixture was then poured into moulds and set aside for curing.

For further comparison a one in five sand and cement block was also cast in a mould, and also set aside for curing.

After curing, the moulds were stripped and each sample allowed to air-dry until their weight became constant. The three test specimens were then completely submerged in a water bath for a period of 48 hours. The specimens were then surface dried and weighed to determine the change in weight with the following results;

Percent absorption in water
Treated pumice _____ 5.2
Sand cement _____ 6.0
Untreated pumice _____ 40.3

It should be noted that water repelling agent was not added to the gauge water.

The results indicate clearly that treated pumice has a comparable absorption to dense aggregate. Therefore, such treated aggregates may be used in concrete mix designs enabling a minimum amount of gauge water to be used. This close control of the water cement ratio factor in porous aggregate and portland cement mixtures must result in improved ultimate strengths, reduced shrinkage, shorter drying out periods and marked reduction in overall cost. The same samples have been subjected to cycles of wetting and drying over the past two years without any significant change in absorption characteristics.

It has been pointed out above that the hydrophobic properties conferred upon the lightweight building material aggregates by employing the method of the present invention are carried forward into building materials fabricated from such aggregates.

It has also been discovered that hydrophobic properties may be conferred upon dense concretes by applying the method of the present invention to aggregates such as rock, stone, quartz, various silicates, marble crushings, brick crushings, gravel and sand, prior to or in the course of manufacturing concrete from these aggregates. The procedure seldom requires more than the incorporation of the impregnant composition with the aggregate and mixing thoroughly, drying the coated aggregate, repeating the process using the precipitant composition, and once more drying the resultant hydrophobic coated aggregate. When very concentrated solutions of the impregnant composition are used drying may be found unnecessary and the treatment with the precipitant composition may be proceeded with immediately.

The impregnant and precipitant compositions may even be used with dense concrete aggregates or aggregates of low porosity which are to be included in the production by simple successive incorporation with the gauge water and proceeding with conventional concrete processing techniques. For example: to three quarters of the known amount of gauge water usually required for a normal concrete mixture, is added the concentrated impregnant composition at the rate of one pint for each 100 pounds of cement used in the mix. Cement and aggregate are now added and thoroughly mixed. When the mixture is homogeneous and plastic, one pint of concentrated precipitant composition is added and thoroughly incorporated into the mix. Small increments of water may now be added to achieve a desired degree of workability and slump. Similar procedures may be used when mixing plasters and mortars while bearing in mind that less water will be required in the mixture because of the particle lubricating effect of the additive. After pouring freshly prepared treated concrete into forms or moulds, it is essential to ensure that no significant loss of water takes place during setting and curing. Significant loss of water at the curing stage will induce development of water-repellence prematurely to impede the normal progress of hydration of cement and seriously endanger the development of any anticipated or required compressive strength. Freshly poured concrete should be protected from atmospheric carbon dioxide and moisture-loss by covering with polyethylene or vinyl chloride sheeting. Moulds and forms should be so effectively covered as to main humidity as near to 100 percent as practicable.

What is claimed is:

1. A method of rendering water-pervious building materials of fabricated cementitious materials or lightweight aggregates hydrophobic which comprises the steps of impregnating said building materials with an impregnant composition consisting essentially of an emulsion of unsaponified wax globules in an aqueous solution of water-soluble soaps, and a compatible antioxidant, converting said water-soluble soaps into water-insoluble metallic soaps by contacting the impregnated building material with a precipitant composition consisting essentially of an aqueous solution of water-soluble metallic salts, the metallic cations being such that will form water-insoluble metallic soaps, and drying the resultant hydrophobic building material.

2. A method as claimed in claim 1 wherein said water-pervious building material is a lightweight aggregate of naturally occurring lightweight aggregate, artificially expanded lightweight aggregates or sintered lightweight aggregates.

3. A method as claimed in claim 1 wherein said building material is a fabricated cementitious material and the conversion of the water-soluble soaps in said impregnant composition into hydrophobic water-insoluble metallic soaps is in part effected by calcium ions already present in said cementitious material.

4. A method as claimed in claim 1, wherein said building material is a fabricated cementitious material, which comprises the steps of successively coating said fabricated cementitious material first with said precipitant composition, then with said impregnant composition and if desired, again with said precipitant composition, and drying the resultant hydrophobic coated fabricated cementitious material.

5. A process as claimed in claim 1 wherein the impregnant composition has been produced by saponifying at least one composition selected from the group consisting of partially saponifiable waxes, mixtures of saponifiable fatty acids and unsaponifiable waxes and mixtures of saponifiable waxes and unsaponifiable waxes, and also containing a compatible antioxidant, and an alkali selected from the group consisting of ammonium hydroxide, alkali metal hydroxides, morpholine, mono-, di- and triethanolamine.

6. A method as claimed in claim 1 wherein the compatible antioxidant is butylated hydroxytoluene.

7. A method as claimed in claim 1 wherein the impregnant composition also contains an emulsion stabilising agent selected from the group consisting of gelatin, casein, gum acacia, hydroxymethyl cellulose, ethyl cellulose, carboxymethyl cellulose, carboxyvinyl polymers and polyacrylates.

8. A method as claimed in claim 1, wherein said building material is a fabricated cementitious material and the conversion of the water-soluble soaps in said impregnant composition into hydrophobic water-insoluble metallic soaps is in part effected by calcium ions formed in situ by a prior treatment of said fabricated cementitious material with a hydrochloric acid solution.

9. A method as claimed in claim 2 which comprises the steps of immersing said lightweight aggregate in said impregnant composition, draining excess impregnant composition from the resultant impregnated aggregate, immersing said impregnated aggregate in said precipitant composition, draining excess precipitant composition from the resultant hydrophobic aggregate, and drying said hydrophobic aggregate.

10. A method as claimed in claim 2 which comprises the steps of successively spraying said lightweight aggregate falling under gravity first with said impregnant composition and then with said precipitant composition, and drying the resultant hydrophobic aggregate.

11. A method according to claim 2 wherein said building material is a naturally occurring lightweight aggregate of volcanic ash, scoria, diatomite or perlite rhyolites.

12. A method according to claim 2 wherein said building material is a sintered lightweight aggregate produced from perlite, vermiculite, obsidian, slate, shale, furnace slags or clay.

13. A method as claimed in claim 5 wherein said partially saponifiable waxes are selected from the group consisting of Japan wax, Carnauba wax, beeswax and candelilla wax.

14. A method as claimed in claim 5 wherein said unsaponifiable waxes are selected from the group consisting of paraffin waxes, ceracines, products of refining paraffin, and ozokerite.

15. A method as claimed in claim 5 wherein said fatty acids are selected from the group consisting of oleic acid, olein, stearic acid, and palmitic acid.

16. A method as claimed in claim 5 wherein said composition is a mixture of colophony resin, Japan wax, Carnauba wax, oleic acid and olein.

17. A method as claimed in claim 9 wherein said lightweight aggregate is immersed in said impregnant composition under a vacuum.

References Cited

UNITED STATES PATENTS

| | | | |
|---|---|---|---|
| 1,266,955 | 5/1918 | Kniffler | 117—167UX |
| 1,460,251 | 6/1923 | Kramer | 117—167UX |
| 1,625,672 | 4/1927 | Moreton | 117—62.1 |
| 2,307,852 | 1/1943 | Nothum et al. | 117—167X |
| 2,344,579 | 3/1944 | Whitesides | 117—167UX |
| 2,345,142 | 3/1944 | Muller | 117—167 |
| 2,402,903 | 6/1946 | Massey et al. | 117—168 |
| 2,603,576 | 7/1952 | Cook et al. | 117—62.2X |
| 2,650,173 | 8/1953 | Goulding | 117—167X |
| 2,711,378 | 6/1955 | Holzinger | 117—167X |

FOREIGN PATENTS

| | | | |
|---|---|---|---|
| 316,649 | 8/1929 | Great Britain | 117—168 |

WILLIAM D. MARTIN, Primary Examiner

M. R. LUSIGNAN, Assistant Examiner

U.S. Cl. X.R.

117—54, 100, 123, 126, 149, 167, 168